(12) United States Patent
Yarak

(10) Patent No.: US 7,853,817 B2
(45) Date of Patent: Dec. 14, 2010

(54) POWER MANAGEMENT INDEPENDENT OF CPU HARDWARE SUPPORT

(75) Inventor: Dennis A. Yarak, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/497,333

(22) Filed: Jul. 2, 2009

(65) Prior Publication Data

US 2010/0218015 A1      Aug. 26, 2010

Related U.S. Application Data

(60) Provisional application No. 61/155,912, filed on Feb. 26, 2009.

(51) Int. Cl.
*G06F 1/32* (2006.01)
(52) U.S. Cl. .................... 713/323; 713/320
(58) Field of Classification Search ................ 713/300, 713/320, 322, 323, 324
See application file for complete search history.

(56) References Cited

U.S. PATENT DOCUMENTS 6,823,516 B1 * 11/2004 Cooper .................. 718/108
2005/0166073 A1 * 7/2005 Lee ......................... 713/300
2008/0052543 A1 * 2/2008 Sokorac ................... 713/300
2010/0058078 A1 * 3/2010 Branover et al. ........... 713/300

OTHER PUBLICATIONS

"Advanced Configuration and Power Interface Specification", Hewlett-Packard/Intel/Microsoft/Phoenix/Toshiba. Dec. 30, 2005, 624 pages, 373 pages.

* cited by examiner

*Primary Examiner*—Dennis M Butler
(74) *Attorney, Agent, or Firm*—Blakely, Sokoloff, Taylor & Zafman LLP

(57) ABSTRACT

A system including power savings modes, the system including a processor that supports bus semantics in its hardware for a power state of a first level, wherein the first level is lowest power level the processor is able to enter, a system core logic module coupled to the processor, and a memory, coupled to the system core logic module, storing instructions, which when executed by the system, causes the system core logic to be notified of an impending processor idle state that is compatible with the latency required for system core logic power savings modes and wherein, in response to being notified of an impending processor idle state, the system core logic implements thread, core, or package level power saving idle modes lower than supported by the first level based on a latency hierarchy and independent of normal power saving bus semantics.

20 Claims, 5 Drawing Sheets

POWER MANAGEMENT INDEPENDENT OF CPU HARDWARE SUPPORT

This application claims the priority benefit of U.S. Provisional Application No. 61/155,912, filed Feb. 26, 2009, the entire contents of which are hereby incorporated by reference herein.

BACKGROUND

In some Central Processing Unit ("CPU") system architectures, especially those used in battery-powered systems, power saving modes of the CPU are reflected via hardware mechanisms to the system core logic. Based on a well-defined set of bus semantics particular to the CPU, handshakes are achieved which allow core logic to then participate in deeper power saving modes. The deeper modes are most effective when they take advantage of known CPU latency characteristics. This is because system core logic power mode latency can be hidden behind known CPU latency. These latencies, as known in the art, include the time required to enter and/or exit a level of a power saving mode.

The Advanced Configuration and Power Interface ("ACPI") Specification is an open standard for unified operating system-centric device configuration and power management. While the context of the present application is not limited to ACPI, it provides some definitions which are useful for understanding the power modes of industry standard CPU's. ACPI defines various CPU power states ("C-states") of increasing power savings and, usually, with corresponding increasing latency in returning out of deeper level C-states. ACPI defines a mechanism for notifying Operating System ("OS") software of the C-state capabilities and latencies of a CPU thread, core, and package based on CPU identity mechanisms that are known in the art. For example, a system may take approximately 15 microseconds to exit C2 and enter C0.

FIG. 1 is an exemplary state transition diagram for a CPU package and system which implements ACPI power states C0, C1, and C2, from the point of view of an OS that is using the software-abstracted mechanism for entering power saving modes. The power state transition diagram shows the logical (but not physical or bus-semantics) flow of CPU states in a typical computer system. The software-abstracted mechanism for entering power saving modes is the Monitor or "MWait" facility, which is provided by the CPU both to abstract the power saving hardware mechanisms and to extend and improve the facility to work well with multiple CPU cores within a package.

In FIG. 1 we see that a CPU in its normal execution state C0 can enter C1 through execution of a software instruction MWait. The MWait instruction is executed with "hint codes" that tell the CPU which preferred C-state it is to enter. The hardware then translates this into the appropriate semantics for the power saving mode. For the case of C1, there is no difference in front side bus semantics for C1 compared to C0, therefore the system core logic cannot differentiate a CPU in C1 compared to a CPU in C0.

The CPU can also enter C1 through the execution of a Halt ("HLT") instruction. The HLT instruction stops all instruction flow in the CPU until a break event, such as a Non-Maskable Interrupt ("NMI"), System Management Interrupt ("SMI"), or other interrupt, which is asserted by external agents or the local interrupt hardware (LAPIC).

The MWait implementation improves upon the HLT instruction by virtue of a Monitor hardware facility. This is done to enable more threads and cores within a single package to participate in low power modes that require package coordination, such as those that will affect system Core logic power state, or CPU global package voltage, for example.

OS software can "arm" core or thread monitor hardware through sets of instructions that tell the core bus interface to look for a range of physical addresses on the bus. This facility allows other cores or threads within a package to "wake up" the otherwise halted core or thread by performing a write to the Monitor address. Thus, a software scheduler in an OS can use a fast, lightweight mechanism that does not involve the latency of an interrupt to break a core or thread from C1. If the core had been in Auto Halt, the only mechanism to wake it is an interrupt ("IPI").

Similarly, a core or thread that supports C2/MWait will enter C2 when executing an MWait with the hint code appropriate for C2. Unlike for C1, when all the cores and threads have executed their MWait/C2, the CPU package hardware then makes the appropriate bus semantics for entering C2. These semantics notify the system core logic via an I/O transaction on the front side bus targeted to a particular address in system core logic hardware.

As with C2/MWait, deeper C-states such as C3/MWait and C4/MWait have their own bus semantics which complete with different sideband handshakes but that start with the same I/O transaction type, to diverse addresses in system core logic. OS software chooses amongst these lower power and higher latency states based on its own heuristics that are known in the art.

In the bus semantics of an exemplary CPU, when the I/O transaction, known as a Level-n (n=2,3,4) read, is completed, core logic issues Stop Clock ("STPCLK") on the bus and the CPU acknowledges the STPCLK with a special address-only bus cycle. For higher level (n=3,4) C-n states, further semantics control CPU voltage modulation and front side bus quiescing.

Alternately, the CPU can perform the Level-n read directly, avoiding the use of the monitor hardware. In this case the bus semantics are the same. OS software in some cases may choose to enter C-states through this legacy path. For a multithreaded or multi-core system, OS software would need to know that all other threads and cores were in a compatible C-state before issuing the Level read. For single-threaded single-core systems the legacy Level read can be issued unconditionally.

While some CPUs support power saving modes as described above, some lower cost or lower performance CPUs, which may otherwise be well suited to certain mobile applications, may omit hardware support for deeper power saving modes and, therefore, do not allow core logic to take advantage of its built-in hardware for power savings to achieve system-level power savings.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

A method, apparatus, and system are described for CPU packages that do not support some lower levels of power saving, e.g., C-n (n=2, 3, 4), and the respective bus semantics in the CPU hardware that ordinarily would allow system core logic to be notified of a impending CPU package idle state that is compatible with the latency required for system core logic to enter and/or exit power savings modes. Various levels of a power saving mode may include placing a memory into self-refresh, clock clamping, powering down I/O pads, and other power savings methods known in the art. A CPU may be a single core or multi-core microprocessor, or may be a micro controller, or other digital logic which includes at least one power savings state.

An embodiment of the invention can include the following: a CPU package supporting normal Front Side Bus ("FSB") operating mode semantics and capable of reading and writing system core logic registers, an OS implementing thread, core, or package level power saving idle modes deeper than supported by the targeted CPU package that can be mapped by latency requirements, and a system core logic designed for deeper C-n state power saving modes of increasing latency that can take specific CPU-initiated actions to lower power based on its latency hierarchy and independent of normal power saving bus semantics.

Figure 1:
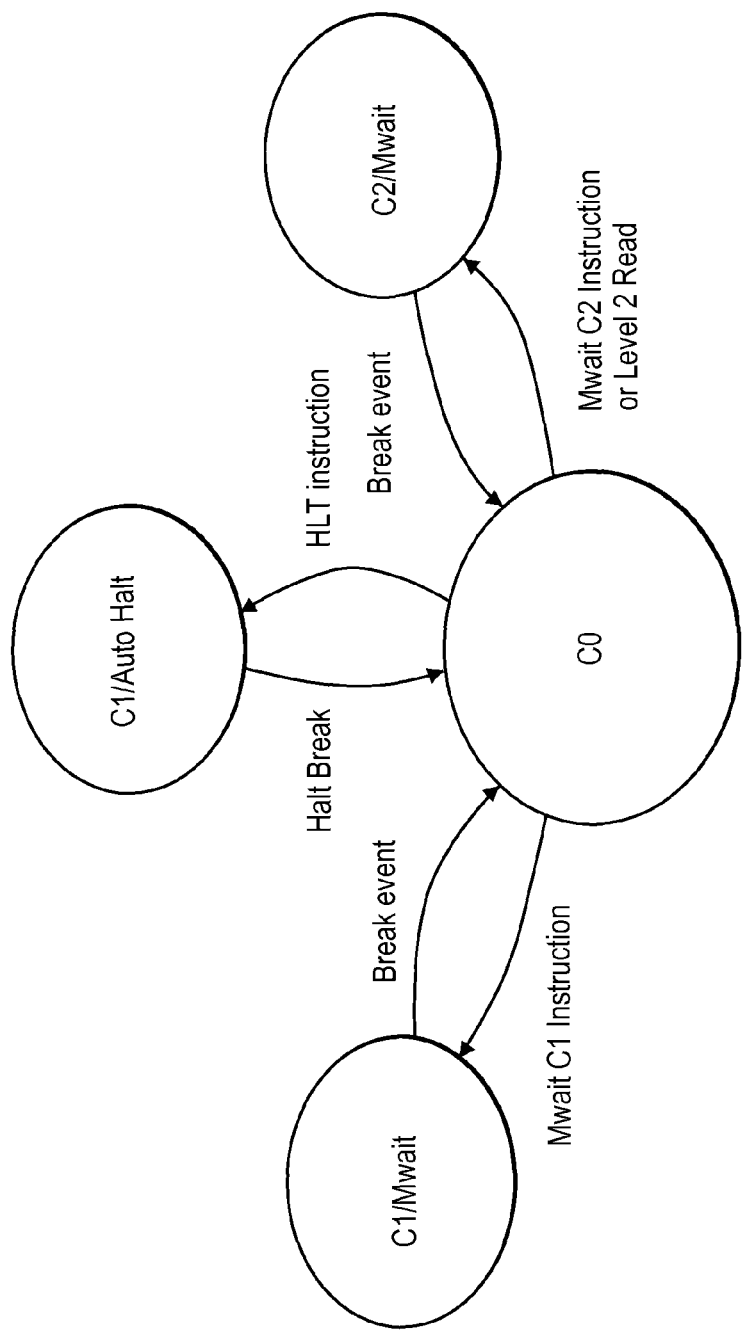
FIG. 1 is an exemplary state transition diagram for a CPU package and system which implements low power states C1 and C2.
Figure 2:
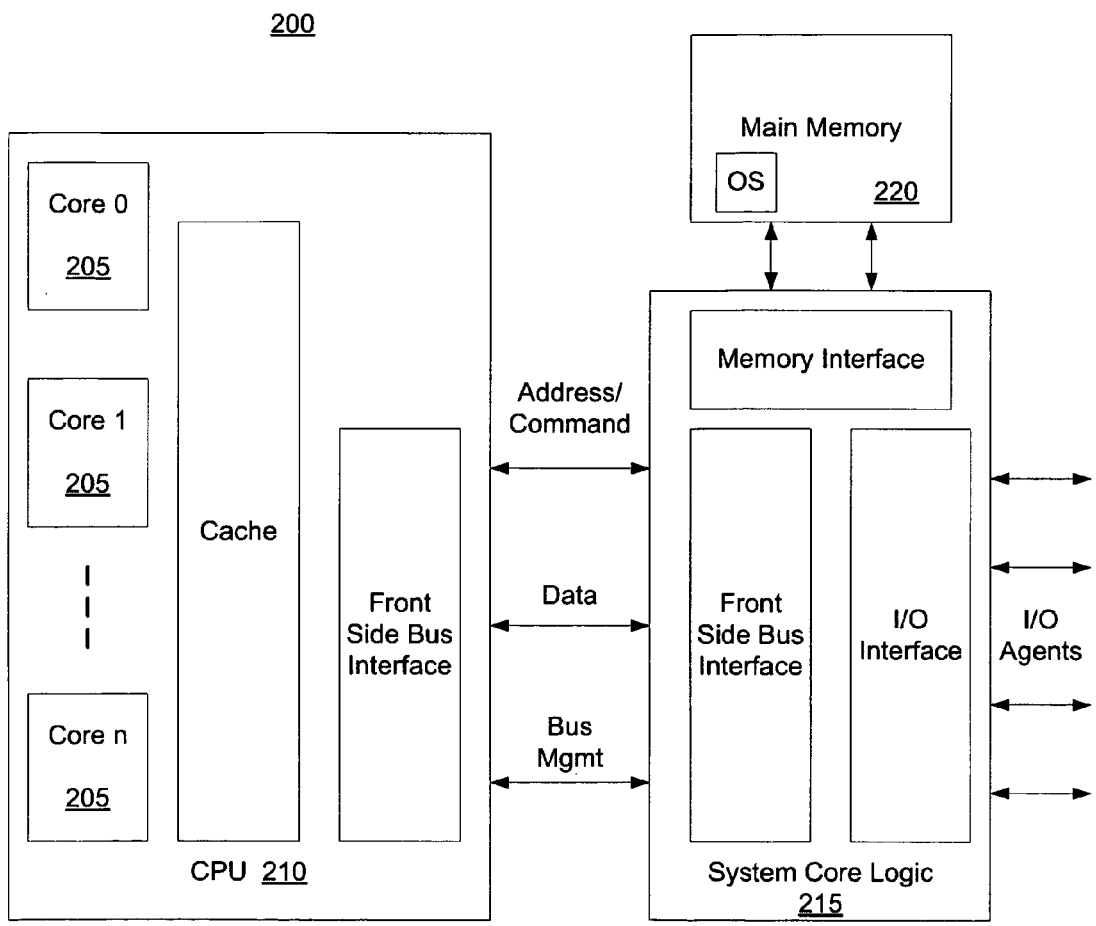
FIG. 2 is an exemplary system block diagram in which embodiments may be implemented.

FIG. 2 is an exemplary block diagram of system 200 in which embodiments of the invention may be implemented. Any of several cores 205 in a CPU 210 share a Front Side Bus with a system core logic 215, which could be made up of multiple chips acting in concert. Additionally, the system core logic 215 is coupled to one or more buses, e.g., one or more PCI buses or other peripheral buses known in the art to send and receive signals to peripheral devices (I/O Agents) attached to the one or more buses. The peripheral devices may include a mouse, a keyboard, and other known input, output, and/or I/O peripheral devices.

For one embodiment, the operations, processes, modules, methods, and systems described and shown in the accompanying figures of this disclosure are intended to operate on one or more exemplary computer systems 200 as sets of instructions (e.g., software), also known as computer implemented methods. The main memory 220 includes a machine-readable (or computer-readable) storage medium on which is stored one or more sets of instructions (e.g. software) embodying any one or more methodologies or functions. The software may also reside, completely or at least partially, within RAM or ROM (not shown) and/or within the CPU 210 during execution thereof by the computer system 200—the RAM, ROM, and within the CPU 210 also constituting machine-readable storage media. The software may further be transmitted or received over a network (not shown) via a network interface device (not shown). The exemplary computer system 200 is generally representative of personal or client computers, mobile devices, (e.g., mobile cellular device, PDA, satellite phone, mobile VoIP device), and servers.

In a system including CPU hardware that supports power saving modes, the CPU 210 and system core logic 215 coordinate to enter low-power states as directed by OS software. The low power states of the CPU 210 are communicated through Front Side Bus ("FSB") semantics encompassing both messages and side band bus management signals. Often the system core logic 215 is responsible for signaling to the CPU 210 entry and exit into a CPU low power state and therefore has knowledge of the latency of the power state. The system core logic 215 can then optimize its own power state and that of attached agents, such as main memory 220, I/O devices, etc. Accordingly, an OS that has decided it can enter an idle state can also benefit from the power savings accomplished in system core logic without extra latency. For example, when the CPU 210 enters the low power state C2, the system core logic 215 may also enter the low power state C2 based on the FSB semantics.

However, when the CPU 210 does not include hardware to enter deeper power savings levels, e.g., C2, C3, etc., and coordinate the power savings mode with the system core logic 215, embodiments of the invention allow the system core logic 215 to be notified of an impending processor idle state that is compatible with the latency required for system core logic to enter deeper power savings modes. In response to being notified of an impending processor idle state, the system core logic implements thread, core, or package level power saving idle modes lower than supported by the first level based on a latency hierarchy and independent of normal power saving bus semantics.

For one embodiment, the CPU 210 includes hardware support to enter a plurality of power savings levels C0-Cn and the system core logic 215 supports entering a plurality of power savings levels C0-Cm, wherein m is greater than n.

Figure 3:
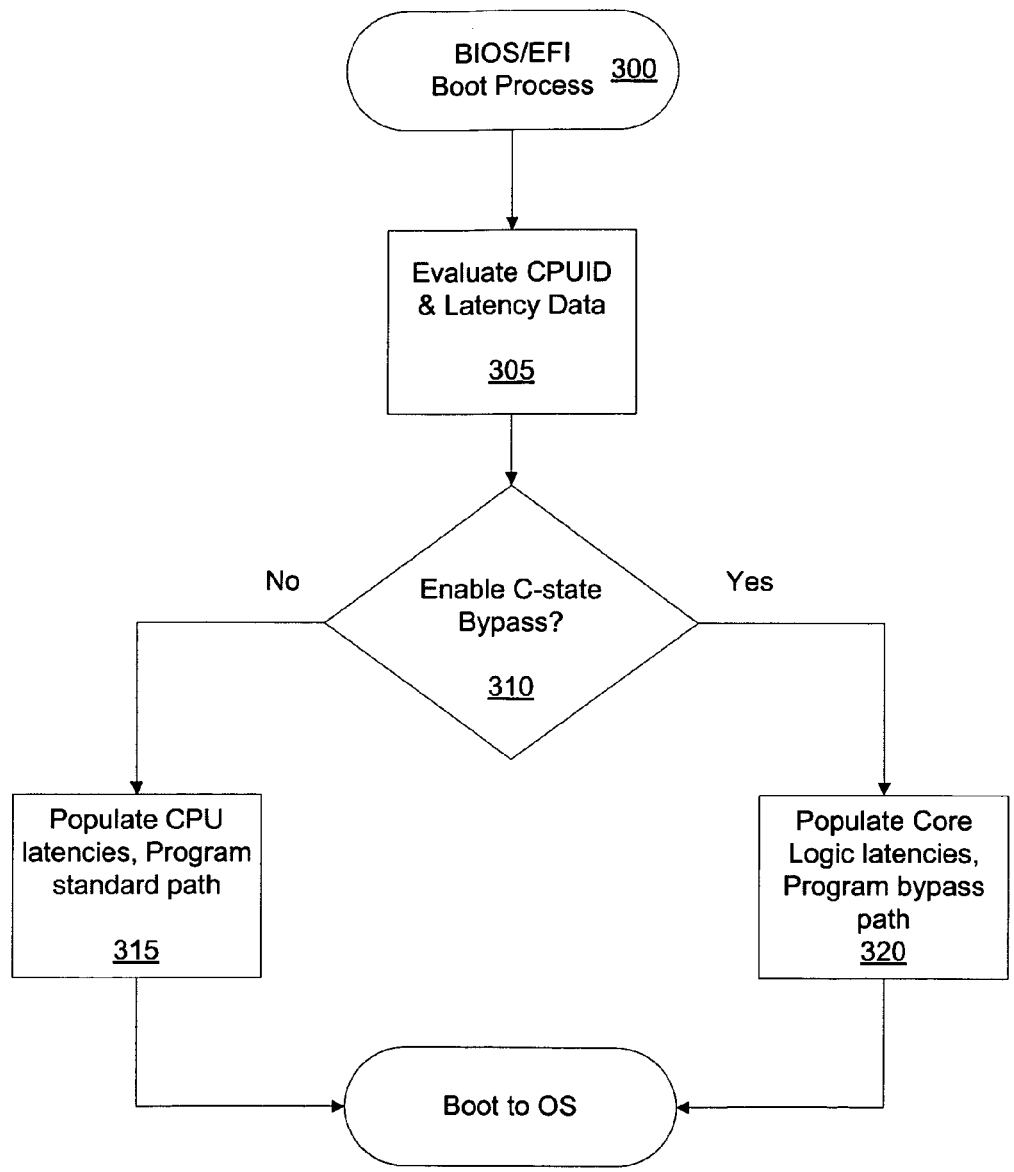
FIG. 3 is a flow chart illustrating an exemplary initialization process according to an embodiment of the invention.

FIG. 3 is a flow chart illustrating an exemplary initialization process 300 for system 200. The initialization process 300 may be executed from firmware, e.g., from Basic Input/Output System ("BIOS") or Extensible Firmware Interface ("EFI"), during boot up of the OS for system 200. At block 305, the capabilities of the CPU 210 are determined, e.g., through a CPU Identification ("CPUID") instruction. At block 310, the process 300 determines, based upon the capabilities of the CPU 210, whether or not to enable a C-state bypass. Additionally, the latencies for the system core logic 215 are identified. The system core logic latencies include the time required for the system core logic 215 to enter and/or exit a level of a power saving mode.

At blocks 315 and 320, the initialization process 300 programs either the standard path or bypass path accordingly. The initialization process 300 ends by booting to the OS.

In a system including CPU hardware that supports lower power saving modes (e.g., for more states than C0 and C1), the bypass may not be not needed. Since the capabilities of the system core logic 215 are known to the BIOS/EFI, and the firmware will have embedded data structures communicating latencies, an embodiment of the invention will have such data structures populated alternately with latencies associated with the CPU 210 and system core logic 215 power saving states at block 315 or block 320. ACPI provides a standardized means of presenting this data, however, a general implementation will provide an alternative data structure so that systems can be built supporting multiple operating systems that may not be aware of bypass capabilities, and with the expected data structures to provide backwards compatibility.

Figure 4:
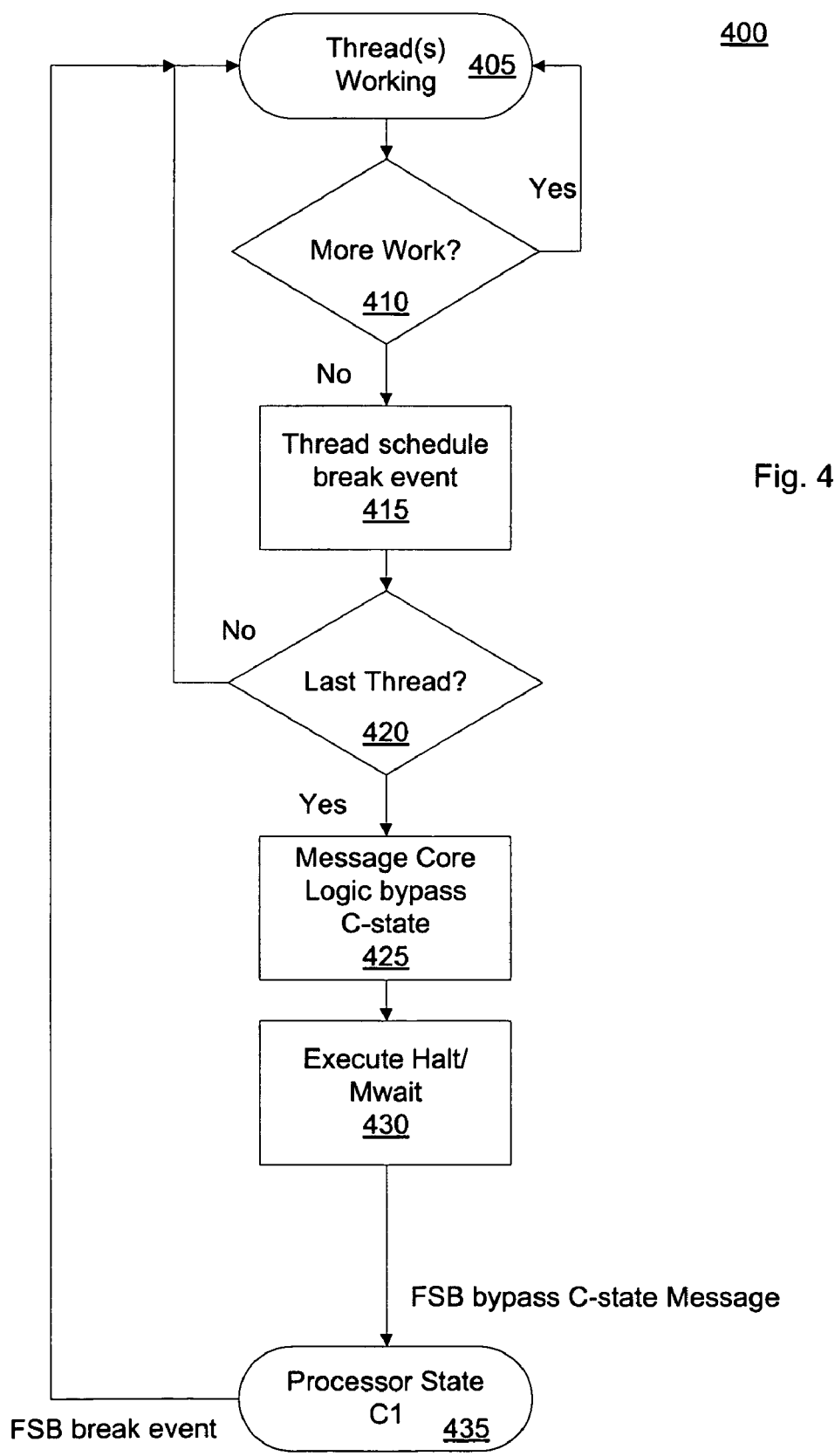
FIG. 4 is a flow chart illustrating an exemplary process performed by the operating system according to embodiment of the invention.

FIG. 4 is a flow chart illustrating an exemplary process 400 performed by the OS according to an embodiment of the invention. At block 405, the process 400 begins with one or more threads being processed. At block 410, the OS (e.g., via the CPU 210), determines if more work needs to be processed. If so, one or more threads continue to be processed at block 405. Alternatively, if there currently is no further work to be performed, the OS schedules a break event at block 415. At block 420, the OS determines if the last thread has been processed and is entering an idle state. If not, one or more threads continue to be processed at block 405. Otherwise, the OS messages the system core logic 215 to enter into the bypass state when the last thread is entering a compatible idle state at block 425 and a Halt or MWait is executed at block 430. For example, the CPU 210 may enter a state C1 at block 435, while the system core logic may use the bypass path to enter C2 (or a deeper state). If a FSB break event occurs, the process 400 resumes at block 405.

Figure 5:
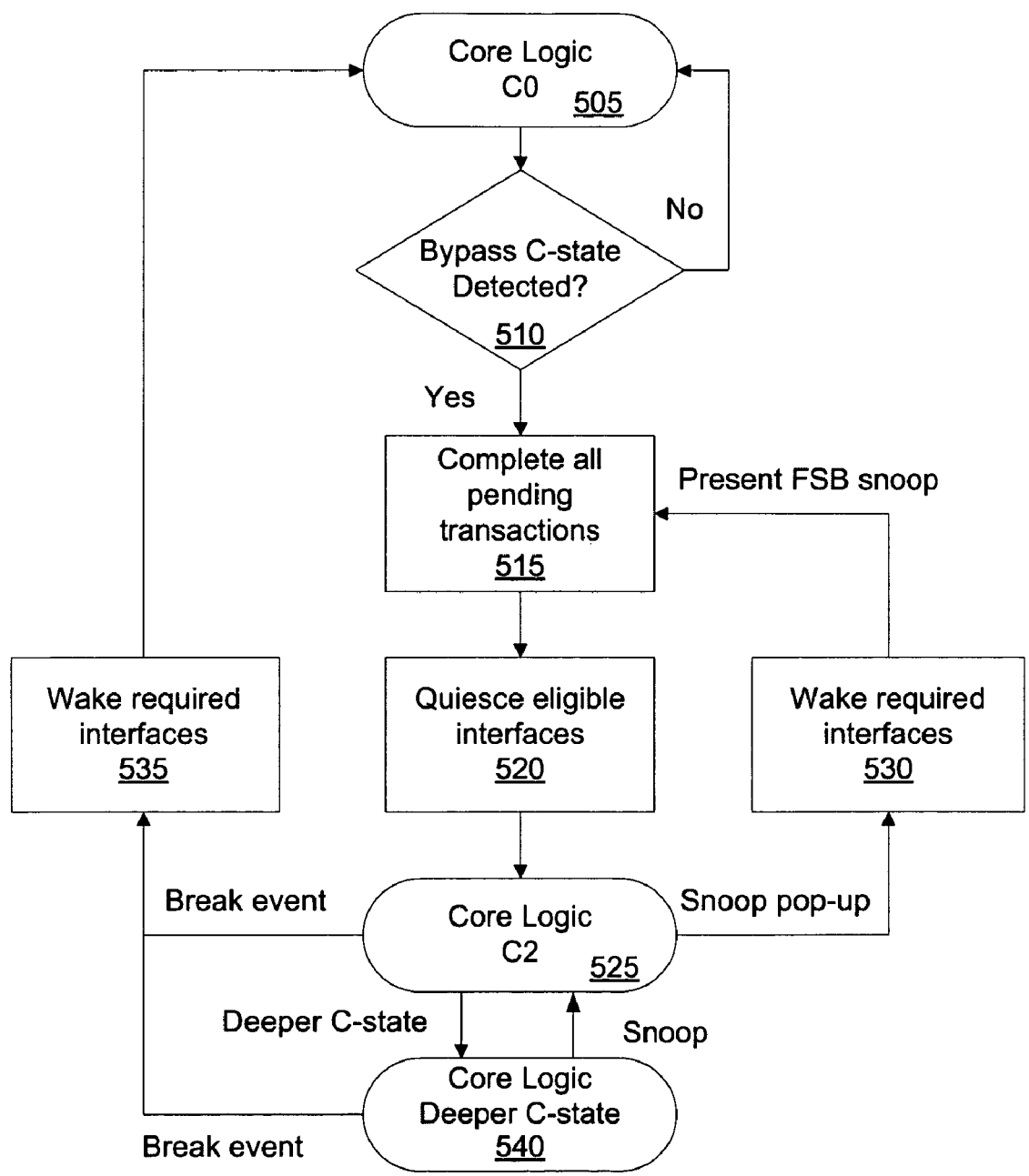
FIG. 5 is a flow chart illustrating an exemplary process performed by the system core logic according to embodiment of the invention.

FIG. 5 is a flow chart illustrating an exemplary process 500 performed by the system core logic 215 according to an embodiment of the invention. Process 500 illustrates how the system core logic 215 detects and enters the bypass C-states. At block 505, the system core logic 215 is operating at a normal power state, e.g., C0. If a bypass C-state notice is detected at block 510, the system core logic 215 completes all pending transactions at block 515. At block 520, the system core logic 215 quiesces eligible interfaces (e.g., the one or more peripheral buses coupled to the core logic). At block 525, the system core logic 215 enters a lower power state, e.g., C2 (while the CPU 210 remains in a higher power state, e.g., C0 or C1).

In response to a snoop, the system core logic 215 will "pop-up" and wake required interfaces at block 530. Snoops, such as might be requested by downstream I/O agents reading from and writing to their memory space, get serviced without breaking the C1 event in the CPU. The FSB snoop will be presented and pending transactions will be completed at block 515 and resume the process as described above. Alternatively, if a break event is detected, the system core logic 215 will wake the required interfaces at block 535 and resume normal operations at a higher power mode, e.g., C0.

Process 500 is described above in regard to a transition through bypass-C2. However, deeper C-states 540 are supported via a pop-up to C2, in response to a snoop or via a break event back to C0. For one embodiment, main memory enters and exits self-refresh as directed by the pop-up needs of snoops.

In a system including a multi-threaded multi-core CPU 210 and OS that does not coordinate thread and core states to the package level, embodiments may include system core logic 215 to track individual thread states by implementing a per-thread register space identifying the C-n state of each thread. The OS is notified of the location of the registers per thread. The OS will then set these registers on entry into MWait routine and unset them on MWait exit. When the identified threads agree on a minimum C-n state, the system core logic 215 initiates the power-saving mode appropriate to that C-state.

For example, if a system boot code identifies system core logic 215 support for Cn states with associated latencies, and CPU 210 support for only C1, the boot code passes information on the needed redirection messages address space to the OS. After the OS boots and as threads go idle and schedule wake ups, the preferred C-state for each thread is written to the register space identified by boot code. When the system core logic 215 identifies a minimum common C-state amongst the threads, it initiates entry into its power state consistent with the latency of that C-state. System wake ups are scheduled interrupts (e.g., via a timer), NMI, SMI and device interrupts from the system core logic 215.

This implementation may not provide the best performance and power savings opportunities, since the threads are not coordinated at the software level to a package state. For example, a thread can enter C2, with a short exit time scheduled, and another thread can enter C2 just as the first thread is scheduled to exit. If the core logic enters C2 the wake up time on the first thread will be missed waiting for the entry and exit delay of the C2 core logic latency. This negatively affects both power and performance.

For one embodiment, the system core logic 215, in addition to tracking C-states from the CPU, also starts a timer per thread when it receives the MWait message, e.g., at block 430 as shown in FIG. 4. This expiry timer is set to a value slightly less than the requested C-state entry and exit latency. When the timer expires without all other threads joining the C-state, the C-state of the thread is demoted to the next lower latency, and a new timer expiry is set reflecting the demoted C-state latency.

It is known that in modern battery-operated systems, most usage models have very extensive periods of CPU idle, and, in these idle periods, the scheduled wake ups for the deepest C-states extend far beyond the entry and exit latency of the hardware. Accordingly, for an embodiment using timers to expire C-state entry for each thread, criterion may disable the timer for the lowest (highest latency) supported C-state. For one embodiment, the OS sets the timer on entry, since it may be possible for the idling thread to know when its wake up is scheduled to occur. This would provide power savings without adding performance-degrading latency to the system.

One embodiment is implemented within a system including a single core single threaded CPU 210 that is missing the hardware for higher C-states but still has the capability for direct legacy Level-n I/O reads to the core logic. The OS will have no advantage in the single-thread single core case in using MWait enhancements, so it can simply perform the Level-n read compatible with the described C-state latency. In this case, the system core logic 215 will repurpose Level-n read requests to delete the bus semantics. It will suppress the normal C-n bus semantics because the CPU 210 does not support them. The method used to cancel semantics in system core logic 215 can be implementation dependent. However, since from the bus perspective the CPU 210 is in an active state, known normal methods for quiescing the bus may be used as required to allow the FSB piece of the system core logic 215 to maximize power savings. Signals that can be used for this include a Bus Priority Request ("BPRI") and Block Next Request ("BNR").

For example, the system boot code identifies system core logic 215 support for Cn states with target latencies and CPU 210 support for only C1. The boot code configures the system core logic 215 to cancel Cn state bus semantics. After the OS boots, the OS may determine to enter a deeper C-state, Cn, where n states are distinguished by the identified latency of the core logic. For one embodiment, the OS schedules a break event using a timer interrupt in the system core logic 215. The OS issues level-n read and then goes to Halt. The system core logic 215 enters appropriate power saving mode until broken by scheduled timer interrupt or other interrupt such as NMI, SMI, or other device interrupt.

A range of embodiments can be implemented spanning the examples above using less or more core logic hardware to coordinate threads, cores, or packages. For one embodiment, the OS coordinates the threads at the core and package level itself. In this case it could use the legacy path outlined above to communicate to the system core logic 215 that has been programmed to cancel bus semantics of the C-state. Alternately at the cost of some extra hardware, a separate address space could be identified for notification and canceling of the C-state, which brings about the altered semantics.

In the foregoing specification, the invention has been described with reference to specific exemplary embodiments thereof. It will be evident that various modifications may be made thereto without departing from the broader spirit and scope of the invention as set forth in the following claims. An article of manufacture may be used to store program code providing at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention. The specification and drawings are, accordingly, to be regarded in an illustrative sense rather than a restrictive sense.

What is claimed is:

1. A system including power saving levels, the system comprising:
    a processor that supports bus semantics in its hardware for a power state of a first level, wherein the first level is a lowest power saving level the processor is able to enter;
    a system core logic module coupled to the processor, wherein the system core logic can enter a greater number of power saving levels than the processor; and
    a memory, coupled to the system core logic module, storing instructions, which when executed by the system, causes the system core logic to be notified of an impending processor idle state that is compatible with a latency required for a system core logic power saving level and wherein, in response to being notified of an impending processor idle state, the system core logic implements a thread, core, or package level power saving level lower than supported by the first level based on a latency hierarchy and independent of normal power saving bus semantics.

2. The system of claim 1, wherein the processor supports a plurality of power saving levels including a second power saving level that saves less power than the first level.

3. The system of claim 1, wherein the latency required for the system core logic power saving level includes the time required for the system core logic to enter and exit the power saving level and wherein the impending processor idle state is identified to last longer than or approximately the same amount of time as the latency required for the system core logic power saving level.

4. The system of claim 1, wherein the processor supports multiple threads and the system tracks power states for each thread.

5. The system of claim 4, wherein the system core logic implements the power saving level when the power states for each thread is lower than a maximum power state.

6. The system of claim 4, wherein the system core logic starts a timer for a thread when the system core logic is notified of an impending idle state, wherein the timer is set to an amount of time that is less than or equal to the entry and exit latency for a power saving level corresponding to the thread's power state.

7. The system of claim 6, wherein, upon expiration of the timer, the system core logic determines that the thread is in a lower power state than another thread, demotes the thread to a power state that uses more power than the thread's current state, and resets the timer to an amount of time that is less than or equal to the entry and exit latency of a power saving level corresponding to the thread's demoted power state.

8. A method for implementing power saving levels in a system including a processor and system core logic, the method comprising:
    notifying the system core logic of an impending processor idle state that is compatible with a latency required for a system core logic power saving level, wherein the processor supports bus semantics in its hardware for a power state of a first level, the first level is a lowest power saving level the processor is able to enter, and wherein the system core logic can enter a greater number of power saving levels than the processor; and
    in response to being notified of an impending processor idle state, implementing a thread, core, or package level power saving level by the system core logic, wherein the power saving level is lower than supported by the first level based on a latency hierarchy and independent of normal power saving bus semantics.

9. The method of claim 8, wherein the processor supports a plurality of power saving levels including a second power saving level that saves less power than the first level.

10. The method of claim 8, wherein the latency required for the system core logic power saving level includes the time required for the system core logic to enter and exit the power saving level and wherein the impending processor idle state is identified to last longer than or approximately the same amount of time as the latency required for the system core logic power saving level.

11. The method of claim 8, wherein the processor supports multiple threads, further comprising:
    tracking power states for each thread.

12. The method of claim 11, wherein the power saving level is implemented when the power states for each thread is lower than a maximum power state.

13. The method of claim 11, further comprising:
    starting a timer for a thread in response to the notification of an impending idle state, wherein the timer is set to an amount of time that is less than or equal to the entry and exit latency for a power saving level corresponding to the thread's power state.

14. The method of claim 13, further comprising:
    upon expiration of the timer, determining that the thread is in a lower power state than another thread;
    demoting the thread to a power state that uses more power than the thread's current state; and
    resetting the timer to an amount of time that is less than or equal to the entry and exit latency of a power saving level corresponding to the thread's demoted power state.

15. A machine-readable storage medium storing instructions that, when executed, cause a machine to perform a method comprising:
    notifying the system core logic of an impending processor idle state that is compatible with a latency required for a system core logic power saving level, wherein the processor supports bus semantics in its hardware for a power state of a first level, the first level is a lowest power saving level the processor is able to enter, and wherein the system core logic can enter a greater number of power saving levels than the processor; and
    in response to being notified of an impending processor idle state, implementing a thread, core, or package level power saving level by the system core logic, wherein the power saving level is lower than supported by the first level based on a latency hierarchy and independent of normal power saving bus semantics.

16. The machine-readable storage medium of claim 15, wherein the processor supports a plurality of power saving levels including a second power saving level that saves less power than the first level.

17. The machine-readable storage medium of claim 15, wherein the latency required for the system core logic power saving level includes the time required for the system core logic to enter and exit the power saving level and wherein the impending processor idle state is identified to last longer than or approximately the same amount of time as the latency required for the system core logic power saving level.

18. The machine-readable storage medium of claim 15, wherein the processor supports multiple threads, further comprising:
   tracking power states for each thread.

19. The machine-readable storage medium of claim 18, wherein the power saving level is implemented when the power states for each thread is lower than a maximum power state.

20. The machine-readable storage medium of claim 18, further comprising:
   starting a timer for a thread in response to the notification of an impending idle state, wherein the timer is set to an amount of time that is less than or equal to the entry and exit latency for a power saving level corresponding to the thread's power state;
   upon expiration of the timer, determining that the thread is in a lower power state than another thread;
   demoting the thread to a power state that uses more power than the thread's current state; and
   resetting the timer to an amount of time that is less than or equal to the entry and exit latency of a power saving level corresponding to the thread's demoted power state.

* * * * *